(12) United States Patent
Jiang et al.

(10) Patent No.: US 8,295,344 B2
(45) Date of Patent: Oct. 23, 2012

(54) ADAPTIVE RATE CONTROL FOR ENCODING OF VARIABLE FRAME RATE VIDEO SOURCES

(75) Inventors: Wenqing Jiang, San Jose, CA (US); Weiping Pan, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1401 days.

(21) Appl. No.: 11/876,444

(22) Filed: Oct. 22, 2007

(65) Prior Publication Data
US 2009/0103609 A1  Apr. 23, 2009

(51) Int. Cl.
*H04N 7/12* (2006.01)
(52) U.S. Cl. .............. 375/240.03; 375/240.12
(58) Field of Classification Search .............. None
See application file for complete search history.

(56) References Cited

U.S. PATENT DOCUMENTS

| | | | |
|---|---|---|---|
| 5,878,166 A * | 3/1999 | Legall | 382/232 |
| 5,986,712 A * | 11/1999 | Peterson et al. | 375/240.14 |
| 7,058,721 B1 * | 6/2006 | Ellison et al. | 709/231 |
| 7,535,959 B2 * | 5/2009 | Lightstone et al. | 375/240.04 |
| 2004/0213346 A1 * | 10/2004 | Matsumura et al. | 375/240.03 |
| 2005/0008075 A1 * | 1/2005 | Chang | 375/240.03 |
| 2006/0171457 A1 * | 8/2006 | DeGarrido et al. | 375/240.03 |
| 2007/0009027 A1 * | 1/2007 | Zhu et al. | 375/240.03 |
| 2007/0081590 A1 * | 4/2007 | Goh et al. | 375/240.03 |
| 2007/0097257 A1 * | 5/2007 | El-Maleh et al. | 348/419.1 |
| 2007/0153914 A1 * | 7/2007 | Hannuksela et al. | 375/240.26 |
| 2007/0189380 A1 * | 8/2007 | Goh et al. | 375/240.03 |
| 2008/0084925 A1 * | 4/2008 | Rozen et al. | 375/240.01 |
| 2008/0151998 A1 * | 6/2008 | He | 375/240.03 |

OTHER PUBLICATIONS

"PixelTools Rate Control and H.264", http://www.pixeltools.com/rate_control_paper.html, h.264 rate control algorithm dynamically adjusts encoder parameters, (downloaded on Oct. 26, 2007), 6 pages.
Milani, Simone et al., "A Rate Control Algorithm for the H.264 Encoder", Proceedings of the Sixth Baiona Workshop on Signal Processing in Communications, Baiona, Spain, Sep. 2003, pp. 390-396.

\* cited by examiner

*Primary Examiner* — Faruk Hamza
*Assistant Examiner* — Andrew Oh
(74) *Attorney, Agent, or Firm* — Fiala & Weaver P.L.L.C.

(57) ABSTRACT

Methods, systems, and apparatuses for performing rate control for encoding of video frames are provided. A first timestamp is received that indicates a capture time for a prior video frame. A second timestamp is received that indicates a capture time for a current video frame. A time difference between the second timestamp and the first timestamp is determined. An average video data bit encoding rate is multiplied by the determined time difference to calculate a bit budget. An indication of a number of video data bits that have been encoded is received. The number includes a number of encoded video data bits of the prior video frame and of any further video frames encoded subsequent to the prior video frame and prior to the current video frame. A virtual buffer fill level is adjusted based on a difference between the indicated number of video bits that have been encoded and the calculated bit budget. A quantizer parameter is adjusted based on the adjusted virtual buffer fill level. The current video frame is encoded according to the adjusted quantizer parameter.

20 Claims, 6 Drawing Sheets

ADAPTIVE RATE CONTROL FOR ENCODING OF VARIABLE FRAME RATE VIDEO SOURCES

BACKGROUND OF THE INVENTION

1. Field of the Invention

The present invention relates to video data processing.

2. Background Art

An increasing number of devices are being produced that are enabled to capture and display images. For example, mobile devices, such as cell phones, are increasingly being equipped with cameras to capture images, including still snapshots and motion video images. Images captured by such devices can frequently be viewed on displays of the devices, as well as being transferred from the devices for viewing elsewhere. To view the images on relatively small devices, the images typically must be viewed on small display screens that are not capable of viewing the full resolution of the captured images. Thus, such devices must include at least limited image processing capability to down-size the images for viewing on the small display screens.

Many mobile devices have limited processing capability due to cost, power consumption, and size constraints. However, the processing of captured images, especially the processing of video, is very computationally intensive. For example, many mobile devices have cameras capable of capturing images of 2 MegaPixels (MPel) or more. Thus, a processor of such a mobile device must be capable of processing a large amount of data for each captured image. Furthermore, encoding and decoding (e.g., QCIF) of image data may need to be performed by the processor at frame rates such as 15 fps and 30 fps, respectively, as well as the performance of other functions.

Due to cost and portability concerns, a camera of a mobile device tends to have a small lens size, and the f-number of the lens (the ratio of lens focal length to lens diameter) is usually fixed or supports a very limited range of choices. To enable a sufficient amount of light to reach the camera sensor under various lighting conditions, a common strategy is to add an automatic exposure control (AEC) mechanism. AEC adaptively changes an exposure time, aperture size, signal gain settings, and/or other camera parameters according to detected lighting conditions.

A camera exposure time tends to be longer for dark/indoor settings and shorter for bright/outdoor settings. As a result, the video data output from the camera includes a higher number of frames per second for bright settings than for dark settings. Most camera module designs can have a wide range for the video frame rate. For example, variable frame rates from 5 fps to 30 fps, depending on the particular light conditions, are not uncommon. A video encoder that receives the video data must be able to adapt to the different frame rates. Whether or not the video encoder can adapt well is a key to high-quality video recording end-user experiences.

Practical video encoding applications are constrained either by a limited storage capacity of the recording media or the channel bandwidth of the communication link. Various video data rate control algorithms have been developed to deal with these limited resources. Such rate control algorithms, however, typically assume that video data is received at a constant frame rate. In some existing approaches, video frames that are received at a variable frame rate are re-sampled at fixed time instants to model a fixed frame rate source. Some other existing approaches estimate the frame rate based on the incoming video data, and then apply the estimated frame rate to future incoming data. Because video capture operations in small handheld devices are typically performed on a more instantaneous basis compared to more controlled settings (such as in larger camcorders), the resulting video tends to include more non-stationary characteristics, such as higher amounts of motion and variable frame rates. Because of this, accurate frame rate estimation is very difficult if not impossible. The mentioned approaches can also lead to noticeable delays and/or jerky motion in resulting encoded video data.

Thus, ways are desired for improving the processing of video data having variable frame rates in devices, such as mobile devices.

BRIEF SUMMARY OF THE INVENTION

Methods, systems, and apparatuses for performing rate control of the encoding of video frames are provided. A first timestamp is received that indicates a capture time for a prior video frame. A second timestamp is received that indicates a capture time for a current video frame. A time difference between the second timestamp and the first timestamp is determined. An average video data bit encoding rate is multiplied by the determined time difference to calculate a bit budget. An indication of a number of video data bits that have been encoded is received. This number includes a number of encoded video data bits of the prior video frame and of any further video frames encoded subsequent to the prior video frame and prior to the current video frame. A virtual buffer fill level is adjusted based on a difference between the indicated number of video bits that have been encoded and the calculated bit budget. A quantizer parameter is adjusted based on the adjusted virtual buffer fill level.

For example, the quantizer parameter may be increased (leading to more bit compression) if the adjusted virtual buffer fill level is less than a predetermined amount. The quantizer parameter may be decreased (less bit compression) if the adjusted virtual buffer fill level is greater than the predetermined amount. The current video frame is encoded according to the adjusted quantizer parameter.

In an example of adjustment of the virtual buffer fill level, if the number of encoded video data bits of the prior video frame is less than a prior virtual buffer fill level, the number of encoded video bits of the prior video frame are subtracted from the prior virtual buffer fill level to calculate an updated virtual buffer fill level. If the number of encoded video data bits of the prior video frame is greater than the prior virtual buffer fill level, the updated virtual buffer fill level is set to the prior virtual buffer fill level. The calculated bit budget is added to the updated virtual buffer fill level. If the updated virtual buffer fill level is greater than a maximum virtual buffer fill level, the updated virtual buffer fill level is set to the maximum virtual buffer fill level. The adjusted virtual buffer fill level is the updated virtual buffer fill level.

Values of the quantizer parameter used for a predetermined number of encodings of previously captured video frames may be stored. An average of the stored quantizer parameter values may be determined. The calculated average quantizer parameter value may be used to limit adjustments of the current quantizer parameter. For example, in one implementation, the quantizer parameter may be enabled to be adjusted if an absolute value of a difference between a calculated adjusted value for the quantizer parameter and the determined average of the stored quantizer parameter values is greater than a predetermined threshold value.

In another example aspect of the present invention, a system for encoding video data is provided. The system includes a rate control module. The rate control module receives a first timestamp that indicates a capture time for a prior video frame and a second timestamp that indicates a capture time for a current video frame. The rate control module includes a difference determiner, a multiplier, a virtual buffer fill calculator, and a comparator. The difference determiner is configured to determine a time difference between the second timestamp and the first timestamp. The multiplier is configured to multiply an average video data bit encoding rate by the determined time difference to calculate a bit budget. The virtual buffer fill calculator receives an indication of a number of video data bits that have been encoded, including a number of encoded video data bits of the prior video frame and of any further video frames encoded subsequent to the prior video frame and prior to the current video frame. The virtual buffer fill calculator is configured to adjust a virtual buffer fill level based on a difference between the indicated number of video bits that have been encoded and the calculated bit budget. The comparator is configured to compare the adjusted virtual buffer fill level to a predetermined virtual buffer fill level. A quantizer parameter of a video data encoder is adjusted based on the comparison of the adjusted virtual buffer fill level to the predetermined virtual buffer fill level.

The system may further include an encoder. The encoder is configured to encode the current video frame according to the adjusted quantizer parameter.

The system may further include storage, an averager, and a difference determiner. The storage stores values of the quantizer parameter used for a predetermined number of encodings of previously captured video frames. The averager is configured to determine an average of the stored quantizer parameter values. The difference determiner is configured to determine a difference between the adjusted value for the quantizer parameter and the determined average of the stored quantizer parameter values. The quantizer parameter is enabled to be adjusted if an absolute value of the determined difference between an adjusted value for the quantizer parameter and the determined average of the stored quantizer parameter values is greater than a predetermined threshold value.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Image Processing in Mobile Devices

Embodiments of the present invention relate to image processing performed in devices. For example, embodiments include mobile devices where image processing must be performed with limited resources. Types of such mobile devices include mobile phones (e.g., cell phones), handheld computing devices (e.g., personal digital assistants (PDAs), BLACKBERRY devices, PALM devices, etc.), handheld music players (e.g., APPLE IPODs, MP3 players, etc.), and further types of mobile devices. Such mobile devices may include a camera used to capture images, such as still images and video images. The captured images are processed internal to the mobile device.

Figure 1:
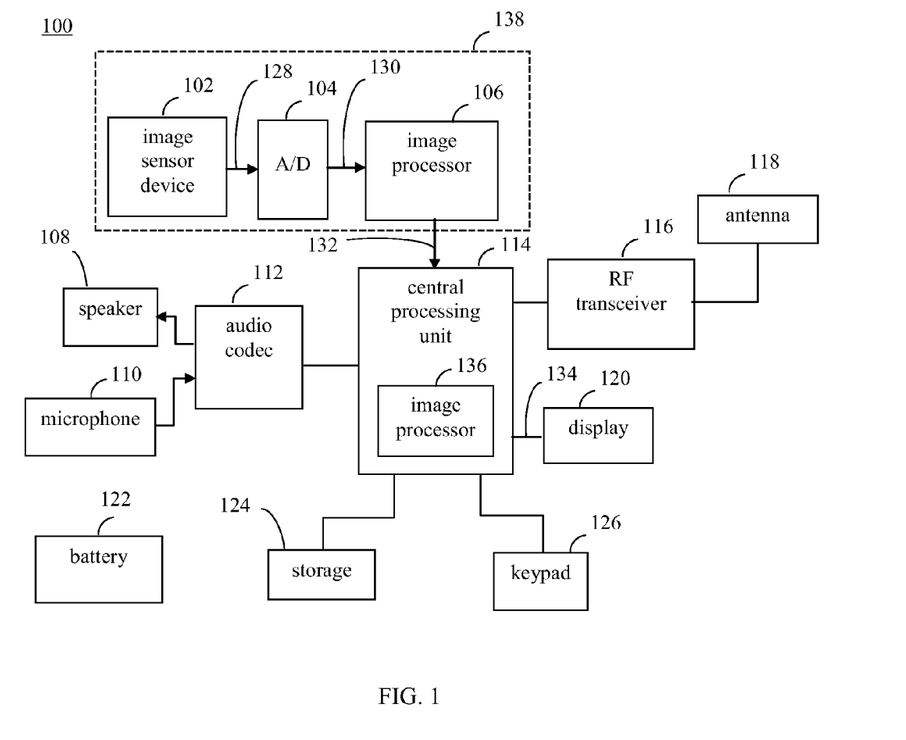
FIG. 1 shows a block diagram of an example mobile device with image capture and processing capability.

FIG. 1 shows a block diagram of an example mobile device 100 with image capture and processing capability. Mobile device 100 may be a mobile phone, a handheld computing device, a music player, etc. The implementation of mobile device 100 shown in FIG. 1 is provided for purposes of illustration, and is not intended to be limiting. Embodiments of the present invention are intended to cover mobile devices having additional and/or alternative features to those shown for mobile device 100 in FIG. 1.

As shown in FIG. 1, mobile device 100 includes an image sensor device 102, an analog-to-digital (A/D) 104, an image processor 106, a speaker 108, a microphone 110, an audio codec 112, a central processing unit (CPU) 114, a radio frequency (RF) transceiver 116, an antenna 118, a display 120, a battery 122, a storage 124, and a keypad 126. These components are typically mounted to or contained in a housing. The housing may further contain a circuit board mounting integrated circuit chips and/or other electrical devices corresponding to these components. Each of these components of mobile device 100 is described as follows.

Battery 122 provides power to the components of mobile device 100 that require power. Battery 122 may be any type of battery, including one or more rechargeable and/or non-rechargeable batteries.

Keypad 126 is a user interface device that includes a plurality of keys enabling a user of mobile device 100 to enter data, commands, and/or to otherwise interact with mobile device 100. Mobile device 100 may include additional and/or alternative user interface devices to keypad 126, such as a touch pad, a roller ball, a stick, a click wheel, and/or voice recognition technology.

Image sensor device 102 is an image capturing device. For example, image sensor device 102 may include an array of photoelectric light sensors, such as a charge coupled device (CCD) or a CMOS (complementary metal-oxide-semiconductor) sensor device. Image sensor device 102 typically includes a two-dimensional array of sensor elements organized into rows and columns. For example, image sensor device 102 may include a two-dimensional array of pixel sensors (PS) of any size. Each pixel sensor of image sensor device 102 is configured to be sensitive to a specific color, or color range. In one example, three types of pixel sensors are present, including a first set of pixel sensors that are sensitive to the color red, a second set of pixel sensors that are sensitive to green, and a third set of pixel sensors that are sensitive to blue. Image sensor device 102 receives light corresponding to an image, and generates an analog image signal 128 corresponding to the captured image. Analog image signal 128 includes analog values for each of the pixel sensors.

A/D 104 receives analog image signal 128, converts analog image signal 128 to digital form, and outputs a digital image signal 130. Digital image signal 130 includes digital representations of each of the analog values generated by the pixel sensors, and thus includes a digital representation of the captured image. For instance, digital image signal 130 may include pixel data for multiple different colors, such as red pixel data, green pixel data, and blue pixel data (from pixel sensors of image sensor device 102 that are sensitive to the respective colors). For example, pixel data may be captured by image sensor device 102 according to a Bayer pattern image. A Bayer filter mosaic is a color filter array (CFA) for arranging RGB color filters on the array of pixel sensors in image sensor device 102 to generate the Bayer pattern image. The Bayer pattern arrangement of color filters is used in many image sensors of devices such as digital cameras, camcorders, scanners, and mobile devices to create a color image. The filter pattern is 50% green, 25% red and 25% blue, hence is also referred to as "RGBG" or "GRGB." The green pixel sensors are referred to as "luminance-sensitive" elements, and the red and blue pixel sensors are referred to as "chrominance-sensitive" elements. Twice as many green pixel sensors are used as either of the red or blue pixel sensors to mimic the greater resolving power of the human eye with green light wavelengths. Alternatives to the Bayer pattern image may also be used, which include the CYGM filter (cyan, yellow, green, magenta) and RGBE filter (red, green, blue, emerald), which require demosaicing, and the Foveon X3 sensor, which layers red, green, and blue sensors vertically rather than using a mosaic.

Figure 2:
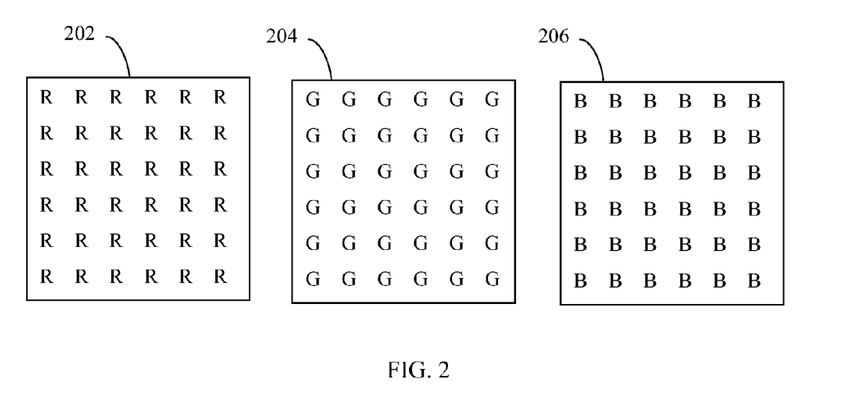
FIG. 2 shows example red, green, and blue color channels generated by an image processor from image data.

Image processor 106 receives digital image signal 130. Image processor 106 performs image processing of the digital pixel sensor data received in digital image signal 130. For example, image processor 106 may be used to generate pixels of all three colors at all pixel positions when a Bayer pattern image is output by image sensor device 102. Image processor 106 may perform a demosaicing algorithm to interpolate red, green, and blue pixel data values for each pixel position of the array of received image data. For example, full arrays of image data for red, green, and blue, respectively, may be generated from received image data formatted according to a Bayer pattern image. For example, FIG. 2 shows a red color channel 202, a green color channel 204, and a blue color channel 206. Red color channel 202 includes a full array of red pixel data values, where a red pixel data value is generated for the position of each "G" and "B" pixel data (such as by averaging the values of the surrounding existing "R" pixel data values). In a likewise manner, a full array of green pixel data values is generated for green color channel 204 and a full array of blue pixel data values is generated for blue color channel 204.

Image processor 106 performs processing of digital image signal 130, such as described above, and generates an image processor output signal 132. Image processor output signal 132 includes processed pixel data values that correspond to the image captured by image sensor device 102. Image processor output signal 132 includes color channels 202, 204, and 206, which each include a corresponding full array of pixel data values, respectively representing red, green, and blue color images corresponding to the captured image.

Note that in an embodiment, two or more of image sensor device 102, A/D 104, and image processor 106 may be included together in a single IC chip, such as a CMOS chip, particularly when image sensor device 102 is a CMOS sensor, or may be in two or more separate chips. For example, FIG. 1 shows image sensor device 102, A/D 104, and image processor 106 included in a camera module 138, which may be a single IC chip.

CPU 114 is shown in FIG. 1 as coupled to each of image processor 106, audio codec 112, RF transceiver 116, display 120, storage 124, and keypad 126. CPU 114 may be individually connected to these components, or one or more of these components may be connected to CPU 114 in a common bus structure.

Microphone 110 and audio CODEC 112 may be present in some applications of mobile device 100, such as mobile phone applications and video applications (e.g., where audio corresponding to the video images is recorded). Microphone 110 captures audio, including any sounds such as voice, etc. Microphone 110 may be any type of microphone. Microphone 110 generates an audio signal that is received by audio codec 112. The audio signal may include a stream of digital data, or analog information that is converted to digital form by an analog-to-digital (A/D) converter of audio codec 112. Audio codec 112 encodes (e.g., compresses) the received audio of the received audio signal. Audio codec 112 generates an encoded audio data stream that is received by CPU 114.

CPU 114 receives image processor output signal 132 from image processor 106 and receives the audio data stream from audio codec 112. As shown in FIG. 1, CPU 114 includes an image processor 136. In embodiments, image processor 136 performs image processing (e.g., image filtering) functions for CPU 114. For example, image processor 136 may perform image processing according to embodiments of the present invention described in detail in the following section. In an embodiment, CPU 114 includes a digital signal processor (DSP), which may be included in image processor 136. When present, the DSP may apply special effects to the received audio data (e.g., an equalization function) and/or to the video data. CPU 114 may store and/or buffer video and/or audio data in storage 124. Storage 124 may include any suitable type of storage, including one or more hard disc drives, optical disc drives, FLASH memory devices, etc. In an embodiment, CPU 114 may stream the video and/or audio data to RF transceiver 116, to be transmitted from mobile device 100.

When present, RF transceiver 116 is configured to enable wireless communications for mobile device 116. For example, RF transceiver 116 may enable telephone calls, such as telephone calls according to a cellular protocol. RF transceiver 116 may include a frequency up-converter (transmitter) and down-converter (receiver). For example, RF transceiver 116 may transmit RF signals to antenna 118 containing audio information corresponding to voice of a user of mobile device 100. RF transceiver 116 may receive RF signals from antenna 118 corresponding to audio information received from another device in communication with mobile device 100. RF transceiver 116 provides the received audio information to CPU 114. In another example, RF transceiver 116 may be configured to receive television signals for mobile device 100, to be displayed by display 120. In another example, RF transceiver 116 may transmit images captured by image sensor device 102, including still and/or video images, from mobile device 100. In another example, RF transceiver 116 may enable a wireless local area network (WLAN) link (including an IEEE 802.11 WLAN standard link), and/or other type of wireless communication link.

CPU 114 provides audio data received by RF transceiver 116 to audio codec 112. Audio codec 112 performs bit stream decoding of the received audio data (if needed) and converts the decoded data to an analog signal. Speaker 108 receives the analog signal, and outputs corresponding sound.

Image processor 106, audio codec 112, and CPU 114 may be implemented in hardware, software, firmware, and/or any combination thereof. For example, CPU 114 may be implemented as a proprietary or commercially available processor, such as an ARM (advanced RISC machine) core configuration, that executes code to perform its functions. Audio codec 112 may be configured to process proprietary and/or industry standard audio protocols. Image processor 106 may be a proprietary or commercially available image signal processing chip, for example.

Display 120 receives image data from CPU 114, such as image data generated by image processor 106. For example, display 120 may be used to display images captured by image sensor device 102. Display 120 may include any type of display mechanism, including an LCD (liquid crystal display) panel or other display mechanism.

Depending on the particular implementation, image processor 106 formats the image data output in image processor output signal 132 according to a proprietary or known video data format. Display 120 is configured to receive the formatted data, and to display a corresponding captured image. In one example, image processor 106 may output a plurality of data words, where each data word corresponds to an image pixel. A data word may include multiple data portions that correspond to the various color channels for an image pixel. Any number of bits may be used for each color channel, and the data word may have any length.

In some implementations, display 120 has a display screen that is not capable of viewing the full resolution of the images captured by image sensor device 102. Image sensor devices 102 may have various sizes, including numbers of pixels in the hundreds of thousand, or millions, such as 1 megapixel (Mpel), 2 Mpels, 4 Mpels, 8 Mpels, etc.). Display 120 may be capable of displaying relatively smaller image sizes. In one example, an image captured by image sensor device 102 may be 640 pixels by 480 pixels in size (307,200 pixels). In contrast, a display screen of display 120 may be 128 pixels by 96 pixels in size (12,288 pixels). Thus, display 120 (having a 12,288 pixel screen size) is not capable of displaying the entire captured image (having 307,200 pixels) at once.

To accommodate such differences between a size of display 120 and a size of captured images, CPU 114 (e.g., image processor 136) must down-size a captured image received from image processor 106 before providing the image to display 120. Such image downsizing may be performed by a subsampling process. In computer graphics, subsampling is a process used to reduce an image size. Subsampling is a type of image scaling, and may alter the appearance of an image or reduce the quantity of information required to store an image. Two types of subsampling are replacement and interpolation. The replacement technique selects a single pixel from a group and uses it to represent the entire group. The interpolation technique uses a statistical sample of the group (such as a mean) to create a new representation of the entire group.

Mobile device 100 includes one or more lenses to focus/direct light on image sensor device 102. Due to cost and portability concerns, mobile device 100 will typically have a small lens size, and the f-number of the lens (the ratio of lens focal length to lens diameter) is usually fixed or supports a very limited range of choices. To enable a sufficient amount of light to reach image sensor device 102 under various lighting conditions, mobile device 100 may include an automatic exposure control (AEC) mechanism. AEC adaptively changes an exposure time, aperture size, signal gain settings, and/or other camera parameters according to detected lighting conditions.

An exposure time tends to be longer for dark/indoor settings and shorter for bright/outdoor settings. As a result, the video data output from camera module 138 includes a higher number of frames per second for bright settings than for dark settings. Camera module 138 may have a wide range for the video frame rate. For example, camera module 138 may have a frame rate that is variable from 5 fps to 30 fps, depending on the particular light conditions. Image processor 136, which may perform a video encoding function for CPU 144, receives the video data and must be able to adapt to processing the video data at the different frame rates. The video encoder of image processor 136 must be capable of adapting to the changing frame rates in order to maintain a high quality video output.

To handle the increased processing load, mobile devices 100 typically are provided with high performance CPUs and/or special purpose image processing chips, which are expensive and consume greater amounts of power, in an undesired manner. Embodiments of the present invention overcome deficiencies of conventional mobile devices. Embodiments enable efficient and high quality encoding of video data at variable frame rates. Example embodiments are described in the following section.

EXAMPLE EMBODIMENTS

The example embodiments described herein are provided for illustrative purposes, and are not limiting. The examples described herein may be adapted to any type of mobile device and other types of devices. Furthermore, additional structural and operational embodiments, including modifications/alterations, will become apparent to persons skilled in the relevant art(s) from the teachings herein.

In embodiments of the present invention, a rate control mechanism is provided that accommodates variable frame rate input video sources. Prior to encoding each video data frame, a capture time for the video frame is recorded. The capture time is transmitted from the camera module along with the captured video frame data. A bit budget for the video encoder is calculated regarding the captured video frame, based on the target bit rate for the encoder and the capture time. The calculated bit budget is compared to a number of bits that have actually been encoded so far by the video encoder, and the fill level of a virtual buffer is adjusted. If the adjusted virtual buffer fill level is higher than a predetermined amount, the video encoder can encode the current frame at a higher bit level. If the adjusted virtual buffer fill level is lower than a predetermined amount, the video encoder must reduce the number of bits used to encode the current frame.

Figure 3:
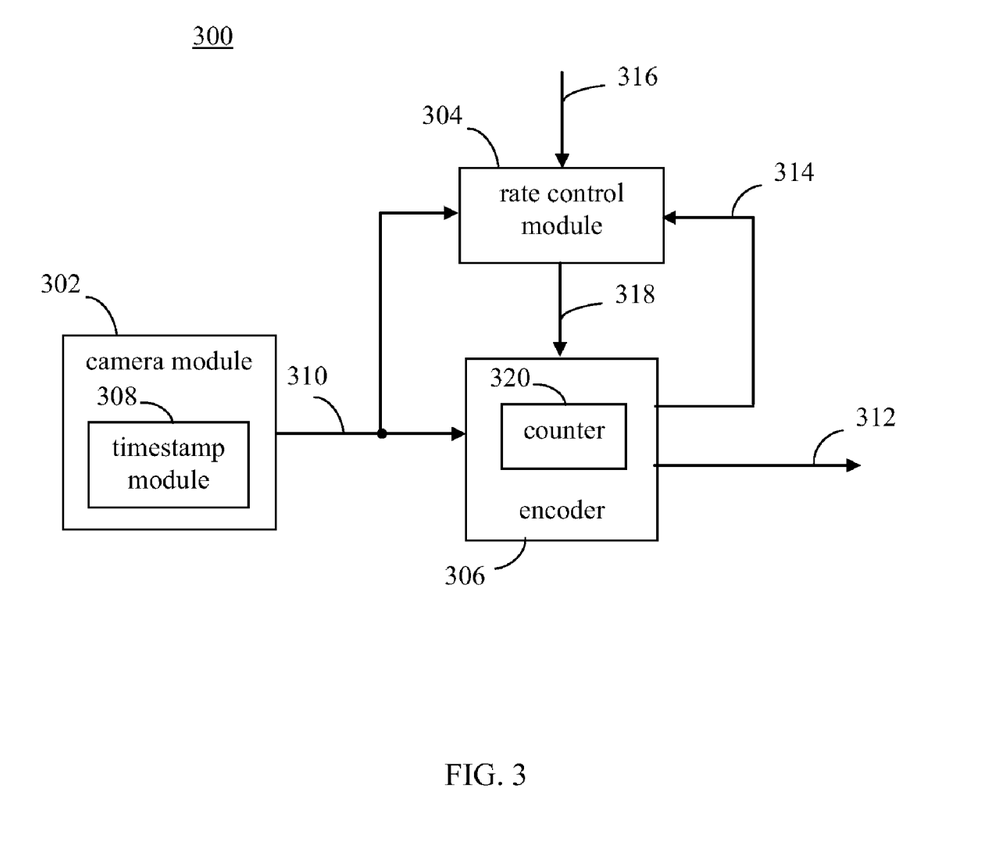
FIG. 3 shows a block diagram of a video data encoding system, according to an example embodiment of the present invention.

FIG. 3 shows a block diagram of a video data encoding system 300, according to an example embodiment of the present invention. As shown in FIG. 3, system 300 includes a camera module 302, a rate control module 304, and an encoder 306.

Camera module 302 captures video images, and generates corresponding video data that is output on a video data signal 310. For example, camera module 302 may include image sensor device 102, A/D 104, and image processor 106 of camera module 138 shown in FIG. 1, and/or additional/alternative elements. In an embodiment, video data signal 310 contains the video data described above that is output on image processor output signal 132, including processed pixel data values that correspond to images captured by an image sensor, such as image sensor device 102. Video data signal 310 may include video data captured on a frame-by-frame basis or other basis. In an embodiment, video data signal 310 may include video data formatted as Bayer pattern data (e.g., similarly to color channels 202, 204, and 206 shown in FIG. 2) or in other image pattern data type mentioned elsewhere herein or otherwise known.

As shown in FIG. 3, camera module 302 includes a timestamp module 308. Timestamp module 308 generates timestamps on a captured video frame-by-captured video frame basis, to indicate an approximate time at which each video frame is captured. In an embodiment, video data signal 310 includes a timestamp generated by timestamp module 308 with each video frame data block provided on video data signal 310.

Rate control module 304 controls a rate at which encoder 306 encodes video data received from camera module 302. Rate control module 304 monitors an amount of bits encoded by encoder 306. If encoder 306 is determined by rate control module 304 to have sufficient bit encoding capacity, rate control module 304 may direct encoder 306 to increase a number of output encoded bits when encoding a received video frame. If encoder 306 is determined by rate control module 304 to have insufficient bit encoding capacity, rate control module 304 directs encoder 306 to decrease a number of output encoded bits when encoding the received video frame.

In an embodiment, rate control module 304 receives video data signal 310 from camera module 302, and extracts the timestamp for each video data frame from video data signal 310. Rate control module 304 further receives an encoded bit count 314, and an average encoding rate 316. Encoded bit count 314 includes a running count of a number of bits encoded by encoder 306. Average encoding rate 316 includes an indication of an average video data bit encoding rate selected for encoder 306. Rate control module 304 calculates a bit budget for each video data frame based on the received timestamp of the video data frame and on the received average video data bit encoding rate. Rate control module 304 adjusts a virtual buffer fill level for each captured video data frame based on a comparison of the bit budget calculated for the video data frame with the bit count of encoded bit count 314. Quantizer parameter 318 selects a type and/or level of compression used by encoder 306 when encoding frame data received on video data signal 310. Rate control module 304 generates a quantizer parameter 318 for each captured video data frame based on the adjusted virtual buffer fill level.

Rate control module 304 may be implemented in hardware, software, firmware, or any combination thereof. For example, referring to module device 100 shown in FIG. 1, rate control module 304 may be implemented in image processor 106 or in CPU 114 (e.g., in image processor 136).

Encoder 306 encodes the video data received on video data signal 310 from camera module 302. Encoder 306 encodes video data of a particular captured video frame according to quantizer parameter 318 received from rate control module 304. Encoder 306 generates an encoded video data signal 312. Furthermore, as shown in FIG. 3, encoder 306 includes a counter 320. Counter 320 generates a running count of a number of bits encoded by encoder 306. Encoder 306 outputs encoded bit count 314, which includes the counted number of encoded bits generated by counter 320.

Encoder 306 may be implemented in hardware, software, firmware, or any combination thereof. For example, referring to module device 100 shown in FIG. 1, encoder 306 may be located in image processor 106 or in CPU 114 (e.g., in image processor 136). Encoder 306 may perform any type of video data encoding (e.g., compression), as would be known to persons skilled in the relevant art(s). For example, encoder 306 may perform encoding according to a proprietary format. Alternatively, encoder 306 may perform encoding according to well known standard formats, including the ITU-T (International Telecommunication Union Telecommunication Standardization Sector) H.263 standard, the ITU-T H.264 standard (also known as MPEG-4 Part 10, or AVC (for Advanced Video Coding)), the MPEG-4 standard (e.g., MPEG-4 Part 2), the MPEG-2 standard, and/or further video data encoding/compression standards, as would be known to persons skilled in the relevant art(s).

Figure 4:
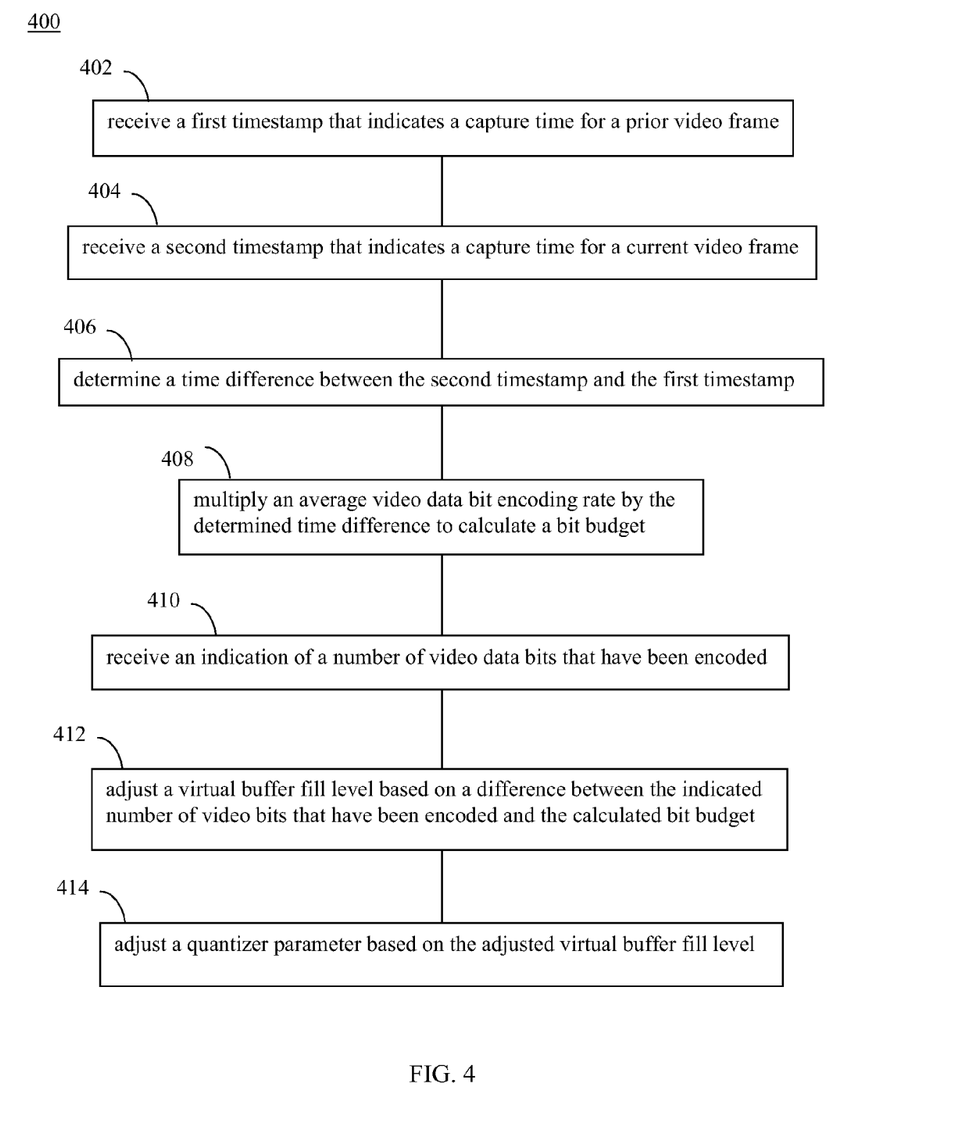
FIG. 4 shows a flowchart providing example steps for performing rate control for encoding of video frames, according to an example embodiment of the present invention.
Figure 5:
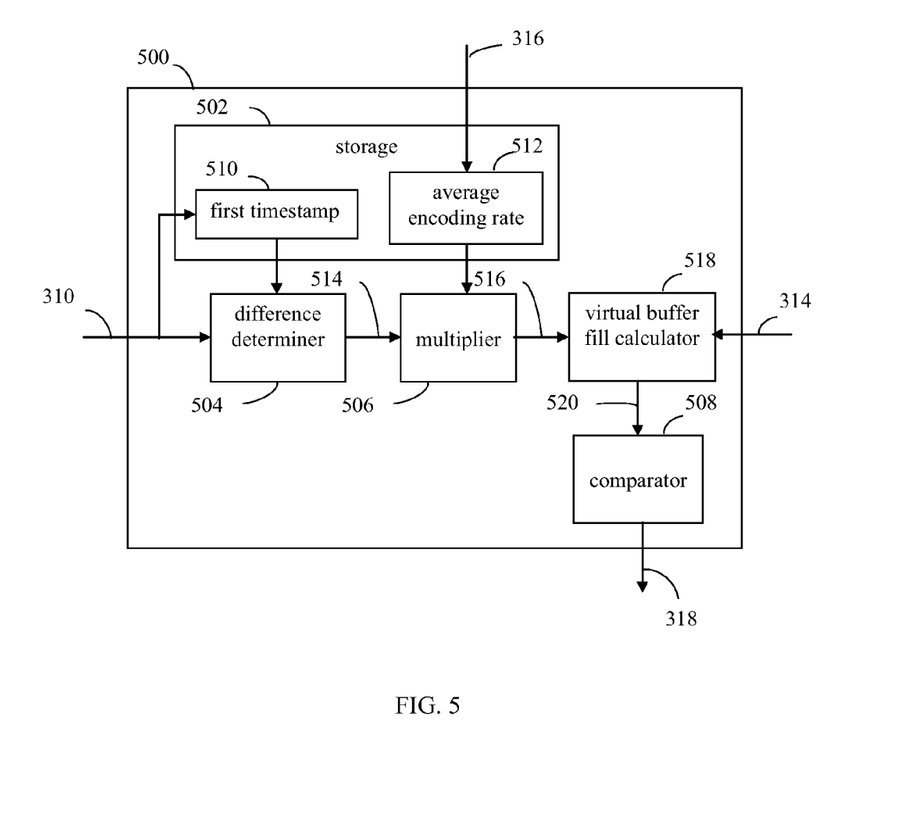
FIG. 5 shows a rate control module, according to an example embodiment of the present invention.

FIG. 4 shows a flowchart 400 providing example steps for performing rate control for encoding of video frames, according to an example embodiment of the present invention. For example, rate control module 304 of FIG. 3 may perform flowchart 400 in an embodiment. FIG. 4 is described with respect to FIG. 5 for illustrative purposes. FIG. 5 shows a rate control module 500, which is an example embodiment of rate control module 304 of FIG. 3. As shown in FIG. 5, rate control module 500 includes a storage 502, a difference determiner 504, a multiplier 506, a comparator 508, and a virtual buffer fill calculator 518. Other structural and operational embodiments will be apparent to persons skilled in the relevant art(s) based on the discussion regarding flowchart 400. Flowchart 400 is described as follows.

Flowchart 400 begins with step 402. In step 402, a first timestamp that indicates a capture time for a prior video frame is received. The first timestamp is a timestamp generated (e.g., by timestamp module 308 of camera module 302) when a prior video frame of a particular video sequence/stream of video frames is captured by the image sensor of camera module 302. Rate control module 500 receives the first timestamp in video data signal 310 from camera module 302. The received first timestamp is stored in storage 502 as first timestamp 510.

In step 404, a second timestamp that indicates a capture time for a current video frame is received. The second timestamp is a timestamp generated (e.g., by timestamp module 308 of camera module 302) when a subsequent video frame of the particular video sequence/stream of video frames is captured by the image sensor of camera module 302. The current video frame may be the video frame immediately following the prior video frame in the sequence of video frames, or may be a later video frame in the sequence of video frames. Difference determiner 504 of rate control module 500 receives the second timestamp in video data signal 310 from camera module 302.

In step 406, a time difference between the second timestamp and the first timestamp is determined. As shown in FIG. 5, difference determiner 504 receives first timestamp 510 from storage 502, and receives the second timestamp in video data signal 310. Difference determiner 504 subtracts first timestamp 510 from the second timestamp to determine a time difference, which is output from difference determiner 504 as time difference 514.

In step 408, an average video data bit encoding rate is multiplied by the determined time difference to calculate a bit budget. For instance, as shown in FIG. 5, rate control module 500 receives average encoding rate signal 316, which includes an indication of an average video data bit encoding rate selected for encoder 306. Encoder 306 may also receive average encoding rate signal 316. According to signal 316, encoder 306 may be set to encode video data at a fixed rate, or may have a selectable variable encoding rate, which may be selected by a user (e.g., of mobile device 500), automatically determined, or otherwise selected. For instance, the user may be enabled to select an image "quality" for video captured by mobile device 100, which results in a particular selection of signal 316. Example encoding rates for average encoding rate signal 316 include 128 Kbits/sec, 256 Kbits/sec, 512 Kbits/sec, 1024 Kbits/sec, and/or any other encoding rate. The received average video data bit encoding rate is stored in storage 502 as average encoding rate 512.

As shown in FIG. 5, multiplier 506 receives time difference 514 from difference determiner 504, and receives average encoding rate 512 from storage. Multiplier 506 multiplies time difference 514 by average encoding rate 512 to calculate a bit budget, which is output as bit budget 516. Bit budget 516 indicates an estimated number of bits that can be encoded by encoder 306 with regard to the current video frame (corresponding to the second timestamp received in step 404) at the average encoding rate for encoder 306.

In step 410, an indication of a number of video data bits that have been encoded is received. For instance, as shown in FIG. 5, rate control module 500 receives encoded bit count 314, which includes a running count of a number of bits encoded by encoder 306. Encoded bit count 314 includes a number of encoded video data bits of the prior video frame (corresponding to first timestamp 510 received in step 402) and of any further video frames encoded subsequent to the prior video frame and prior to the current video frame (corresponding to the second timestamp received in step 404). For example, bit count 314 may be a number of encoded bits output by encoder 306 on encoded video data signal 312 for a current video sequence. Thus, encoded bit count 314 includes a count of a number of bits encoded by encoder 306, which includes a number of encoded bits of the prior video frame and of all following video frames of the current video sequence, except for the current video frame.

In step 412, a virtual buffer fill level is adjusted based on a difference between the indicated number of video bits that have been encoded and the calculated bit budget. For example, as shown in FIG. 5, virtual buffer fill calculator 518 receives bit budget 516 and encoded bit count 314. Virtual buffer fill calculator 518 adjusts a fill level of a virtual buffer based on a difference between bit budget 516 and encoded bit count 314.

Virtual buffer fill calculator 518 may be configured in any way to perform its functions. For example, in an embodiment, virtual buffer fill calculator 518 may perform flowchart 700 shown in FIG. 7, to perform step 412 of flowchart 400. Flowchart 700 provides example steps for adjusting the virtual buffer fill level, according to an example embodiment of the present invention. Other structural and operational embodiments will be apparent to persons skilled in the relevant art(s) based on the discussion regarding flowchart 700. Flowchart 700 is described as follows.

Figure 7:
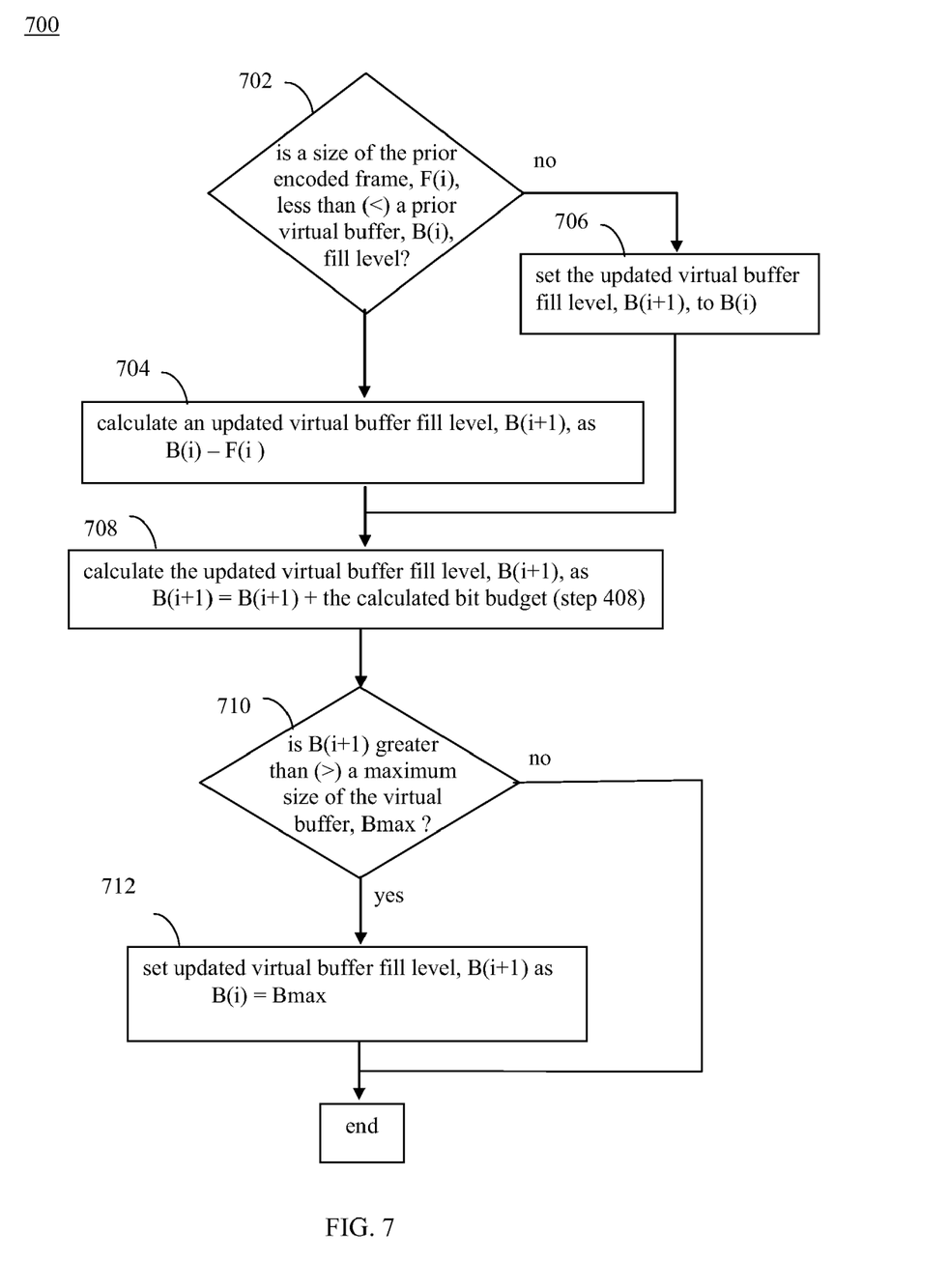
FIG. 7 shows an example flowchart for a virtual buffer, according to an embodiment of the present invention.

Flowchart 700 begins with step 702. In step 702, whether the size of the prior encoded frame (e.g., the number of encoded video data bits of the prior video frame), F(i), is less than a prior virtual buffer fill level, B(i), is determined. In an embodiment, the prior virtual buffer fill value may be stored in storage 502 shown in FIG. 5, or other location. A virtual buffer fill value is a value of an amount of data stored in a virtual buffer. For example, the virtual buffer fill value may be in terms of bits, bytes, or other data storage description. If the size of the prior encoded frame, F(i), is less than a prior fill level of the virtual buffer, B(i), operation proceeds to step 704. Otherwise, operation proceeds to step 706.

In step 704, if the size of the prior video frame is less than a prior virtual buffer fill level (as determined in step 702), the number of encoded video bits of the prior video frame, F(i), is subtracted from the prior virtual buffer fill level, B(i) to calculate an updated virtual buffer fill level, B(i+1). Operation proceeds from step 704 to step 708.

In step 706, if the size of the prior encoded frame, F(i), is greater than the prior virtual buffer fill level, B(i), the updated virtual buffer fill level, B(i+1), is set to the prior virtual buffer fill level, B(i). Operation proceeds from step 706 to step 708.

In step 708, the bit budget (calculated in step 408) is added to the updated virtual buffer fill level, B(i+1), to calculate an updated version of the updated virtual buffer fill level B(i+1). Operation proceeds from step 708 to step 710.

In step 710, whether the updated virtual buffer fill level, (B+1) is greater than a maximum virtual buffer fill level, Bmax, is determined. A value for the maximum virtual buffer fill level, Bmax, may be stored in storage 502 shown in FIG. 5, or in other location. The value for the maximum buffer fill level, Bmax, may be selected to have any value, as dictated by the particular application. If the updated virtual buffer fill level, (B+1) is greater than the maximum virtual buffer fill level, Bmax, operation proceeds to step 712. Otherwise, operation ends (e.g., operation may return to flowchart 400).

In step 712, the updated virtual buffer fill level, B(i+1), is set to the maximum virtual buffer fill level, Bmax. After step 712, operation ends (e.g., operation may return to flowchart 400).

As shown in FIG. 5, virtual buffer fill calculator generates an adjusted virtual buffer fill value 520, which in the embodiment of FIG. 7, is the updated virtual buffer fill level, B(i+1) resulting from flowchart 700.

Referring back to flowchart 400 in FIG. 4, in step 414, a quantizer parameter is adjusted based on the adjusted virtual buffer fill level. For instance, as shown in FIG. 5, comparator 508 receives adjusted virtual buffer fill value 520. Comparator 508 compares adjusted virtual buffer fill value 520 to a predetermined amount, and generates quantizer parameter 318. Quantizer parameter 318 controls a type and/or level of compression used by encoder 306 when encoding frame data received on video data signal 310. The predetermined amount is level of data (e.g., an actual amount of data, a percentage of data, etc.) stored in the virtual buffer that may trigger an update to quantizer parameter 318. The predetermined amount may be any amount of data, percentage of data (e.g., 50%), etc. In an embodiment, quantizer parameter 318 is decreased if the adjusted virtual buffer fill level, B(i+1), is greater than the predetermined amount. Quantizer parameter 318 is increased if the adjusted virtual buffer fill level, B(i+1), is less than the predetermined amount.

A quantizer parameter, also known as a "Q" parameter or quantization parameter, regulates how much spatial detail is preserved in a video frame when compressed by encoder 306. If the quantizer parameter is decreased, more image detail is retained during compression relative to when the quantizer parameter is increased. When the quantizer parameter is increased, more image detail is aggregated during compression, resulting in a decrease in bit rate relative to a decrease in the quantizer parameter. However, the aggregation of image detail when increasing the quantizer parameter results in an increase in distortion and a decrease in image quality. Quantizer parameter 318 can have a range of values to represent different levels of retained spatial detail in video frames. For example, in embodiments, a quantizer parameter can range from 0 to 31, from 0 to 15, or another range as otherwise desired for a particular implementation.

For example, in one embodiment, comparator 516 generates a value for quantizer parameter 318 that is proportional to the difference between adjusted virtual buffer fill level 520 and the predetermined amount. For example, a small value for the quantizer parameter may be generated when adjusted virtual buffer fill level 520 is much greater than the value of the predetermined amount, a small-to-middle range value for the quantizer parameter may be generated when adjusted virtual buffer fill level 520 is close to, but greater than the value of the predetermined amount, while a mid-range value for the quantizer parameter may be generated when adjusted virtual buffer fill level 520 is equal to the value of the predetermined amount. A large value for the quantizer parameter may be generated when adjusted virtual buffer fill level 520 is much less than the value of the predetermined amount, and a middle-to-large range value for the quantizer parameter may be generated when adjusted virtual buffer fill level 520 is close to, but less than the value of the predetermined amount. The change in quantizer parameter may be linearly or nonlinearly related to the difference between adjusted virtual buffer fill level 520 and the predetermined amount, in embodiments.

In another embodiment, quantizer parameter 318 is increased (e.g., incremented) or decreased (e.g., decremented) depending on whether adjusted virtual buffer fill level 520 is greater than or less than the predetermined amount. For example, in an embodiment, quantizer parameter 318 may be adjusted as follows:

if adjusted virtual buffer fill level 520>the predetermined amount, the Q parameter 318 is decreased;

if adjusted virtual buffer fill level 520<the predetermined amount, the Q parameter 318 is increased; and if adjusted virtual buffer fill level 520=the predetermined amount, the Q parameter 318 is unchanged.

Quantizer parameter 318 can be incremented or decremented by 1, increased or decreased by 2, or increased or decreased by any other amount when adjusting quantizer parameter 318, as desired for a particular application.

Figure 6:
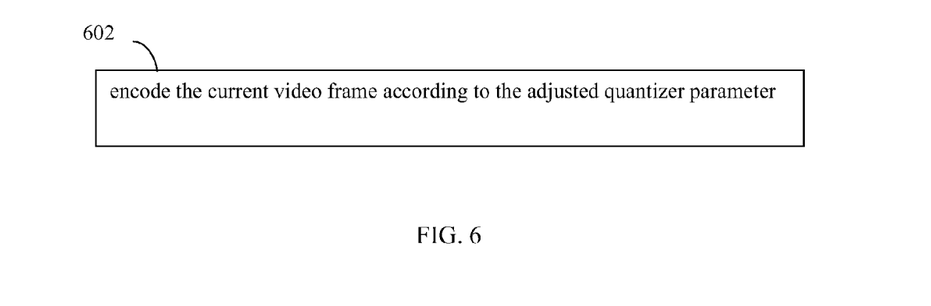
FIG. 6 shows an example step for encoding a video frame, according to an example embodiment of the present invention.

Using the adjusted quantizer parameter value, step 602 shown in FIG. 6 may be performed. In step 602, the current video frame is encoded according to the adjusted quantizer parameter. For example, as shown in FIG. 3, encoder 306 receives quantizer parameter 318 from rate control module 500. Encoder 306 encodes the video data of the current video frame according to quantizer parameter 318, as was adjusted by rate control module 500. Configurations for encoder 306 to encode video data according to a quantizer parameter will be known to persons skilled in the relevant art(s).

Storage 502, difference determiner 504, multiplier 506, comparator 508, and virtual buffer fill calculator 518 of FIG. 5 may be implemented in hardware, software, firmware, and/or any combination thereof. For example, storage 502 may include a physical storage device, such as a memory device (e.g., a static random access memory (SRAM), dynamic random access memory (DRAM), etc.), a hard disc drive, optical storage, etc., or a virtual storage location. Difference determiner 504, multiplier 506, comparator 508, and virtual buffer fill calculator 518 may be implemented as hardware logic, code that executes in a processor (e.g., CPU 114/image processor 136), and/or in any other manner.

In one embodiment, quantizer parameter 318 can be adjusted in step 412 without restrictions. In another embodiment, a rate of change of quantizer parameter 318 in step 412 may be restricted. For example, this may be done to prevent changes of quantizer parameter 318 occurred too often, such as every frame, which may lead to a lack of smoothness that is noticeable in displayed video. A rate of change of quantizer parameter 318 may be restricted in any manner.

Figure 8:
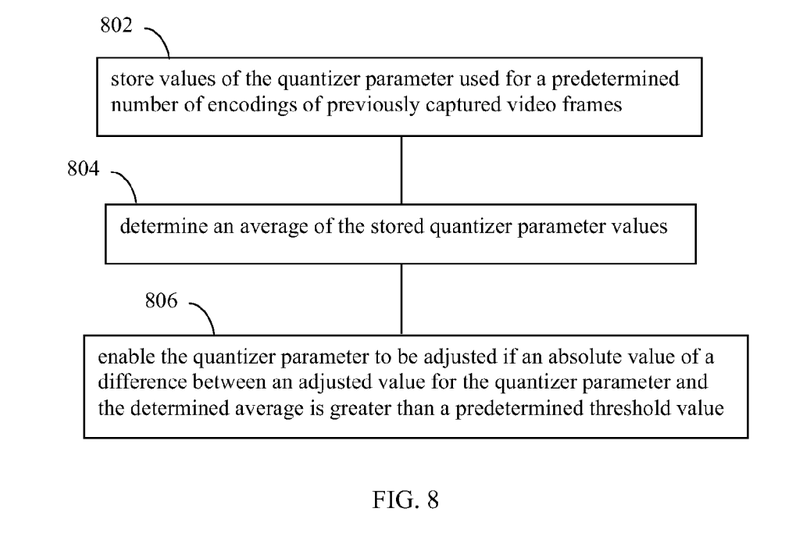
FIG. 8 shows a flowchart providing example steps for restricting a rate of change of a quantizer parameter, according to an example embodiment of the present invention.
Figure 9:
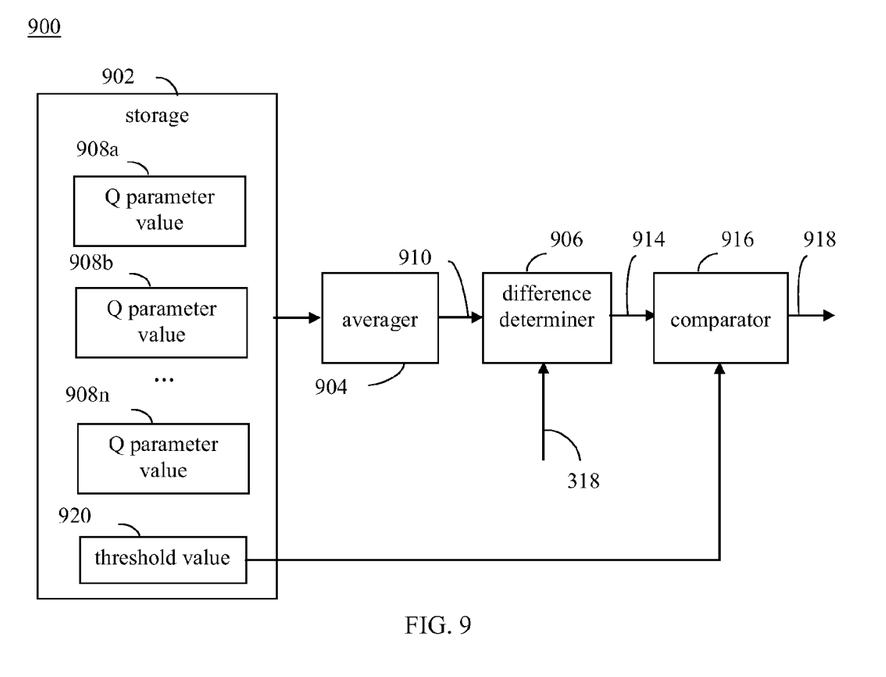
FIG. 9 shows a quantizer parameter adjustment rate control system, according to an example embodiment of the present invention.

For instance, FIG. 8 shows a flowchart 800 providing example steps for restricting a rate of change of a quantizer parameter, according to an example embodiment of the present invention. FIG. 8 is described with respect to FIG. 9 for illustrative purposes. FIG. 9 shows a quantizer parameter adjustment rate control system 900, according to an example embodiment of the present invention. As shown in FIG. 9, system 900 includes storage 902, an averager 904, a difference determiner 906, and a comparator 916. Other structural and operational embodiments will be apparent to persons skilled in the relevant art(s) based on the discussion regarding flowchart 800. Flowchart 800 is described as follows.

Flowchart 800 begins with step 802. In step 802, values of the quantizer parameter used for a predetermined number of encodings of previously captured video frames are stored. For example, as shown in FIG. 9, storage 902 stores quantizer parameter values 908a-908n. Quantizer parameter values 908a-908n are previous values for quantizer parameters 318 generated for previously captured video frames (e.g., for video frames captured prior to the current video frame recited in step 404 in FIG. 4).

In step 804, an average of the stored quantizer parameter values is determined. For example, averager 904 of FIG. 9 may determine an average ("AverageQP") of quantizer parameter values 908, according to the following equation:

$$AverageQP = \frac{\sum_{i=1}^{n} QP_i}{n}$$

Equation 2 where:

n=number of quantizer parameters being averaged, and $QP_i$=the ith quantizer parameter 908.

Averager 904 generates an average quantizer parameter 910. In embodiments, any number (n) of quantizer parameters 908 may be stored and averaged, depending on the particular application.

In step 806, the quantizer parameter is enabled to be adjusted if an absolute value of a difference between an adjusted value for the quantizer parameter and the determined average is greater than a predetermined threshold value. For example, as shown in FIG. 9, difference determiner 906 receives average quantizer parameter 910 and quantizer parameter 318, which is a quantizer parameter calculated for the current video frame. Difference determiner 906 determines a difference between quantizer parameter 318 and average quantizer parameter 910. For instance, difference determiner 906 may subtract one of quantizer parameter 318 and average quantizer parameter 910 from the other of quantizer parameter 318 and average quantizer parameter 910. Difference determiner 906 generates a difference value 914, which is an absolute value of the difference between quantizer parameter 318 and average quantizer parameter 910.

Comparator 916 receives difference value 914 and a threshold value 920 stored in storage 900. Comparator 916 compares difference value 914 and threshold value 920, and generates a quantizer parameter adjustment enable signal 918. Threshold value 920 is selected to control a rate of change of quantizer parameter according to the requirements of a particular video application (e.g., may have values of 0.25, 0.5, 1.0, 2.0, etc.). If difference value 914 is greater than threshold value 920, enable signal 918 provides an enable indication. If difference value 914 is less than threshold value 920, enable signal 918 provides a non-enabled indication. In an embodiment, if enable signal 918 provides an enable indication, the adjusted value of quantizer parameter 318 is provided to encoder 306 for the current video frame. If enable signal 918 provides a non-enabled indication, the value of quantizer parameter 318 prior to being adjusted is provided to encoder 306 for the current video frame (e.g., the same value of quantizer parameter 318 is used as was used to encode the previous video frame).

Storage 902, averager 904, difference determiner 906, and comparator 916 may be implemented in hardware, software, firmware, and/or any combination thereof. For example, storage 902 may be a physical storage device, such as a memory device (e.g., a static random access memory (SRAM), dynamic random access memory (DRAM), etc.), a hard disc drive, optical storage, etc., or a virtual storage location. Storage 902 may be the same or a different storage from storage 502 of FIG. 5. Averager 904, difference determiner 906, and comparator 916 may be implemented as hardware logic, code that executes in a processor (e.g., CPU 114/image processor 136), and/or in other manner.

EXAMPLE SOFTWARE EMBODIMENTS

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system and to storing software in a computer system or other device. The invention, in an embodiment, is directed to such computer program products.

In an embodiment where aspects of the present invention are implemented using software/firmware, the software/firmware may be stored in a computer program product and loaded into a computer system or other device using a removable storage drive, hard drive, or communications interface. The computer system or other device may execute the software/firmware from storage such as a hard drive or memory device (e.g., a ROM device such as an electrically erasable ROM, electrically programmable ROM, a RAM device such as a static RAM, dynamic RAM, etc.). This control logic software/firmware, when executed by a processor, causes the processor to perform the functions of the invention as described herein.

According to an example embodiment, a mobile device may execute computer-readable instructions to process image data, as further described elsewhere herein (e.g., as described with respect to flowchart 400 of FIG. 4, step 602 of FIG. 6, flowchart 700 of FIG. 7, and/or flowchart 800 of FIG. 8), and as recited in the claims appended hereto.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for encoding video data, comprising:
receiving a first timestamp that indicates a capture time for a prior video frame;
receiving a second timestamp that indicates a capture time for a current video frame;
determining a time difference between the second timestamp and the first timestamp;
multiplying an average video data bit encoding rate by the determined time difference to calculate a bit budget;
receiving an indication of a number of video data bits that have been encoded, including a number of encoded video data bits of the prior video frame and of any further video frames encoded subsequent to the prior video frame and prior to the current video frame;
adjusting a virtual buffer fill level based on a difference between the indicated number of video bits that have been encoded and the calculated bit budget; and
adjusting a quantizer parameter based on the adjusted virtual buffer fill level.

2. The method of claim 1, further comprising:
encoding the current video frame according to the adjusted quantizer parameter.

3. The method of claim 1, wherein said adjusting the virtual buffer fill level based on a difference between the indicated number of video bits that have been encoded and the calculated bit budget comprises:
if the number of encoded video data bits of the prior video frame is less than a prior virtual buffer fill level, subtracting the number of encoded video bits of the prior video frame from the prior virtual buffer fill level to calculate an updated virtual buffer fill level;
if the number of encoded video data bits of the prior video frame is greater than the prior virtual buffer fill level, setting the updated virtual buffer fill level to the prior virtual buffer fill level;
adding the calculated bit budget to the updated virtual buffer fill level; and if the updated virtual buffer fill level is greater than a maximum virtual buffer fill level, setting the updated virtual buffer fill level to the maximum virtual buffer fill level;

wherein the adjusted virtual buffer fill level is the updated virtual buffer fill level.

4. The method of claim 1, wherein said adjusting the quantizer parameter based on the adjusted virtual buffer fill level comprises:

decreasing the quantizer parameter if the adjusted virtual buffer fill level is greater than a predetermined amount; and increasing the quantizer parameter if the adjusted virtual buffer fill level is less than the predetermined amount.

5. The method of claim 1, further comprising:

storing values of the quantizer parameter used for a predetermined number of encodings of previously captured video frames; and determining an average of the stored quantizer parameter values;

wherein said adjusting comprises:

enabling the quantizer parameter to be adjusted if an absolute value of a difference between an adjusted value for the quantizer parameter and the determined average of the stored quantizer parameter values is greater than a predetermined threshold value.

6. A system for encoding video data, comprising:

a rate control module that receives a first timestamp that indicates a capture time for a prior video frame and a second timestamp that indicates a capture time for a current video frame, wherein the rate control module includes a difference determiner, a multiplier, a virtual buffer fill calculator; and a comparator;

wherein the difference determiner is configured to determine a time difference between the second timestamp and the first timestamp;

wherein the multiplier is configured to multiply an average video data bit encoding rate by the determined time difference to calculate a bit budget;

wherein the virtual buffer fill calculator receives an indication of a number of video data bits that have been encoded, including a number of encoded video data bits of the prior video frame and of any further video frames encoded subsequent to the prior video frame and prior to the current video frame;

wherein the virtual buffer fill calculator is configured to adjust a virtual buffer fill level based on a difference between the indicated number of video bits that have been encoded and the calculated bit budget;

wherein the comparator is configured to compare the adjusted virtual buffer fill level to a predetermined virtual buffer fill level; and wherein a quantizer parameter of a video data encoder is adjusted based on the comparison of the adjusted virtual buffer fill level to the predetermined virtual buffer fill level.

7. The system of claim 6, further comprising:

an encoder configured to encode the current video frame according to the adjusted quantizer parameter.

8. The system of claim 6, wherein the virtual buffer fill calculator is configured to subtract the number of encoded video bits of a prior video frame from the prior virtual buffer fill level to calculate an updated virtual buffer fill level if the number of encoded video data bits of the prior video frame is less than the prior virtual buffer fill level;

wherein the virtual buffer fill calculator is configured to set the updated virtual buffer fill level to the prior virtual buffer fill level if the number of encoded video data bits of the prior video frame is greater than the prior virtual buffer fill level;

wherein the virtual buffer fill calculator is configured to add the calculated bit budget to the updated virtual buffer fill level;

wherein the virtual buffer fill calculator is configured to set the updated virtual buffer fill level to a maximum virtual buffer fill level if the updated virtual buffer fill level is greater than the maximum virtual buffer fill level; and wherein the adjusted virtual buffer fill level is the updated virtual buffer fill level.

9. The system of claim 6, wherein the quantizer parameter is decreased if the adjusted virtual buffer fill level is greater than a predetermined amount; and wherein the quantizer parameter is increased if the adjusted virtual buffer fill level is less than the predetermined amount.

10. The system of claim 6, further comprising:

storage that stores values of the quantizer parameter used for a predetermined number of encodings of previously captured video frames;

an averager configured to determine an average of the stored quantizer parameter values; and a second difference determiner configured to determine a difference between the adjusted value for the quantizer parameter and the determined average of the stored quantizer parameter values;

wherein the quantizer parameter is enabled to be adjusted if an absolute value of the determined difference between the adjusted value for the quantizer parameter and the determined average of the stored quantizer parameter values is greater than a predetermined threshold value.

11. A computer program product comprising a non-transitory computer usable medium having computer readable program code embodied in said medium for encoding video data, comprising:

a computer readable program code that enables a processor to determine a time difference between a first timestamp that indicates a capture time for a prior video frame and a second timestamp that indicates a capture time for a current video frame;

a computer readable program code that enables a processor to multiply an average video data bit encoding rate by the determined time difference to calculate a bit budget;

a computer readable program code that enables a processor to adjust a virtual buffer fill level based on a difference between an indicated number of video bits that have been encoded and the calculated bit budget, wherein the number of video data bits that have been encoded includes a number of encoded video data bits of the prior video frame and of any further video frames encoded subsequent to the prior video frame and prior to the current video frame; and a computer readable program code that enables a processor to adjust a quantizer parameter based on the adjusted virtual buffer fill level.

12. The computer program product of claim 11, further comprising:

a computer readable program code that enables a processor to encode the current video frame according to the adjusted quantizer parameter.

13. The computer program product of claim 11, wherein said computer readable program code that enables a processor to adjust a virtual buffer fill level based on a difference between an indicated number of video bits that have been encoded and the calculated bit budget comprises:
- a computer readable program code that enables a processor to subtract the number of encoded video bits of the prior video frame from a prior virtual buffer fill level to calculate an updated virtual buffer fill level if the number of encoded video data bits of the prior video frame is less than the prior virtual buffer fill level;
- a computer readable program code that enables a processor to set the updated virtual buffer fill level to the prior virtual buffer fill level if the number of encoded video data bits of the prior video frame is greater than the prior virtual buffer fill level;
- a computer readable program code that enables a processor to add the calculated bit budget to the updated virtual buffer fill level; and
- computer readable program code that enables a processor to set the updated virtual buffer fill level to a maximum virtual buffer fill level if the updated virtual buffer fill level is greater than the maximum virtual buffer fill level;
- wherein the adjusted virtual buffer fill level is the updated virtual buffer fill level.

14. The computer program product of claim 11, wherein said computer readable program code that enables a processor to adjust a quantizer parameter based on the adjusted virtual buffer fill level comprises:
- a computer readable program code that enables a processor to decrease the quantizer parameter if the adjusted virtual buffer fill level is greater than a predetermined amount; and
- a computer readable program code that enables a processor to increase the quantizer parameter if the adjusted virtual buffer fill level is less than the predetermined amount.

15. The computer program product of claim 11, further comprising:
- a computer readable program code that enables a processor to store values of the quantizer parameter used for a predetermined number of encodings of previously captured video frames; and
- a computer readable program code that enables a processor to determine an average of the stored quantizer parameter values;

wherein said computer readable program code that enables a processor to adjust a quantizer parameter based on the adjusted virtual buffer fill level comprises:
- a computer readable program code that enables a processor to enable the quantizer parameter to be adjusted if an absolute value of a difference between an adjusted value for the quantizer parameter and the determined average of the stored quantizer parameter values is greater than a predetermined threshold value.

16. A rate control module for a video data encoder, comprising:
- a difference determiner configured to determine a time difference between a first timestamp that indicates a capture time for a prior video frame and a second timestamp that indicates a capture time for a current video frame;
- a multiplier configured to multiply an average video data bit encoding rate by the determined time difference to calculate a bit budget;
- a virtual buffer fill calculator configured to adjust a virtual buffer fill level based on a difference between an indicated number of video bits that have been encoded and the calculated bit budget, the indicated number of video bits including a number of encoded video data bits of the prior video frame and of any further video frames encoded subsequent to the prior video frame and prior to the current video frame; and
- a comparator configured to compare the adjusted virtual buffer fill level to a predetermined virtual buffer fill level;
- wherein a quantizer parameter of a video data encoder is adjusted based on the comparison of the adjusted virtual buffer fill level to the predetermined virtual buffer fill level.

17. The rate control module of claim 16, wherein the virtual buffer fill calculator is configured to subtract the number of encoded video bits of the prior video frame from a prior virtual buffer fill level to calculate an updated virtual buffer fill level if the number of encoded video data bits of the prior video frame is less than the prior virtual buffer fill level;
- wherein the virtual buffer fill calculator is configured to set the updated virtual buffer fill level to the prior virtual buffer fill level if the number of encoded video data bits of the prior video frame is greater than the prior virtual buffer fill level;
- wherein the virtual buffer fill calculator is configured to add the calculated bit budget to the updated virtual buffer fill level;
- wherein the virtual buffer fill calculator is configured to set the updated virtual buffer fill level to a maximum virtual buffer fill level if the updated virtual buffer fill level is greater than the maximum virtual buffer fill level; and
- wherein the adjusted virtual buffer fill level is the updated virtual buffer fill level.

18. The rate control module of claim 16, wherein the quantizer parameter is decreased if the adjusted virtual buffer fill level is greater than a predetermined amount; and
- wherein the quantizer parameter is increased if the adjusted virtual buffer fill level is less than the predetermined amount.

19. The rate control module of claim 16, further comprising:
- storage that stores values of the quantizer parameter used for a predetermined number of encodings of previously captured video frames;
- an averager configured to determine an average of the stored quantizer parameter values; and
- a second difference determiner configured to determine a difference between the adjusted value for the quantizer parameter and the determined average of the stored quantizer parameter values;
- wherein the quantizer parameter is enabled to be adjusted if an absolute value of the determined difference between an adjusted value for the quantizer parameter and the determined average of the stored quantizer parameter values is greater than a predetermined threshold value.

20. The rate control module of claim 16, wherein the current video frame is encoded according to the adjusted quantizer parameter.

* * * * *

UNITED STATES PATENT AND TRADEMARK OFFICE
CERTIFICATE OF CORRECTION

PATENT NO. : 8,295,344 B2  
APPLICATION NO. : 11/876444  
DATED : October 23, 2012  
INVENTOR(S) : Wenqing Jiang et al.

Page 1 of 1

It is certified that error appears in the above-identified patent and that said Letters Patent is hereby corrected as shown below:

In column 17, line 66, in claim 8, delete "a prior" and insert -- the prior --, therefor.

In column 17, line 66, in claim 8, delete "the prior" and insert -- a prior --, therefor.

Signed and Sealed this
Twelfth Day of February, 2013

Teresa Stanek Rea
*Acting Director of the United States Patent and Trademark Office*